(12) United States Patent
Sun et al.

(10) Patent No.: US 11,960,544 B2
(45) Date of Patent: Apr. 16, 2024

(54) ACCELERATING FETCHING OF RESULT SETS

(71) Applicant: International Business Machines Corporation, Armonk, NY (US)

(72) Inventors: Sheng Yan Sun, Beijing (CN); Shuo Li, Beijing (CN); Xiaobo Wang, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 17/452,705

(22) Filed: Oct. 28, 2021

(65) Prior Publication Data

US 2023/0139707 A1 May 4, 2023

(51) Int. Cl.
*G06F 12/084* (2016.01)
*G06F 16/2458* (2019.01)
*G06F 16/903* (2019.01)

(52) U.S. Cl.
CPC ...... *G06F 16/90335* (2019.01); *G06F 12/084* (2013.01); *G06F 16/2471* (2019.01); *G06F 2212/62* (2013.01)

(58) Field of Classification Search
CPC ............. G06F 16/90335; G06F 12/084; G06F 2212/62; G06F 16/24539; G06F 16/2471
See application file for complete search history.

(56) References Cited

U.S. PATENT DOCUMENTS

| | | | |
|---|---|---|---|
| 9,697,253 B2 | 7/2017 | Chidambaran et al. | |
| 10,061,852 B1 | 8/2018 | Plenderleith | |
| 10,776,355 B1* | 9/2020 | Batsakis | G06F 16/2471 |
| 2006/0212426 A1* | 9/2006 | Shakara | H04L 45/00 |
| 2007/0294236 A1* | 12/2007 | Vaughan | G06F 16/90339 |
| 2010/0138612 A1 | 6/2010 | Wei | |
| 2011/0179075 A1* | 7/2011 | Kikuchi | G06F 16/93 707/769 |
| 2015/0178199 A1 | 6/2015 | Wang et al. | |
| 2019/0102346 A1* | 4/2019 | Wang | G06F 16/906 |
| 2019/0394275 A1* | 12/2019 | Crawford | H04L 67/1097 |
| 2021/0173888 A1 | 6/2021 | Flack et al. | |
| 2021/0191943 A1* | 6/2021 | Chakra | G06F 16/2379 |

(Continued)

FOREIGN PATENT DOCUMENTS

| | | |
|---|---|---|
| CN | 101089829 | 12/2007 |
| CN | 111861203 | 10/2020 |

OTHER PUBLICATIONS

PCT International Search Report and Written Opinion, dated Nov. 11, 2022, regarding Application No. PCT/CN2022/114816, 9 pages.

(Continued)

*Primary Examiner* — Jorge A Casanova

(74) *Attorney, Agent, or Firm* — Yee & Associates, P.C.

(57) ABSTRACT

A computer implemented method processes a query. A number of processor units processes the query to identify a result set in response to receiving the query from a first client. The number of processor units stores, the result set in a shared cache assigned to a group of clients, wherein result set stored in the shared cache is accessible by the group of clients. The number of processor units returns the result set to a second client in the group of clients from the shared cache in response to receiving the query from the second client in the group of clients.

20 Claims, 10 Drawing Sheets

(56) References Cited

U.S. PATENT DOCUMENTS

2022/0129385 A1* 4/2022 Karve ................ G06F 12/0862
2022/0318314 A1* 10/2022 Pasala ................ G06F 16/2471

OTHER PUBLICATIONS

"SQL Performance enhancement by local client cache," An IP.com Prior Art Database Technical Disclosure, dated Feb. 29, 2016, 11 pages.

* cited by examiner

ACCELERATING FETCHING OF RESULT SETS

BACKGROUND

1. Field

The disclosure relates generally to an improved computer system and, more specifically, to processing increasing the speed at which search results can be fetched.

2. Description of the Related Art

Databases are commonly searched to obtain information about various topics. For example, users may search for information about a type of car, a company, or some other information using a search engine. Searches can also be performed to obtain files such as those for the documents, spreadsheets, images, videos, or other type of files. Users may also perform searches as part of a process to purchase goods or services.

These searches involve a client application sending the query to a database server application. The manner in which queries are processed in a database system can greatly affect processor usage, which in turn can affect performance. For example, with sequential query language (SQL) queries, rows of data can be fetched from a table when processing queries. Fetching a qualified row from a table in the database system can involve thousands of central processing unit (CPU) instructions because a database system comprises multiple components in which millions of lines of code located. These thousands of instructions are multiplied by each row that is retrieved in processing a query. Reducing CPU usage in improve the performance of a database system.

Some current solutions for improving SQL query performance involve reducing input/output (I/O) costs and processor usage costs. These solutions can involve, for example, using in memory tables rather than tables located on a disk drive. These solutions also can involve using materialize the views or caching search results. However, these solutions do not always provide a desired level SQL query performance.

SUMMARY

According to one illustrative embodiment, a computer implemented method processes a query. A number of processor units processes the query to identify a result set in response to receiving the query from a first client. The number of processor units stores the result set in a shared cache assigned to a group of clients. The result set stored in the shared cache is accessible by the group of clients. The number of processor units returns the result set to a second client in the group of clients from the shared cache in response to receiving the query from the second client in the group of clients. According to other illustrative embodiments, a computer system and a computer program product for processing a query are provided. As a result, the illustrative embodiments can improve performance in processing queries by reducing at least one of processing resources or input/output operations needed to process queries.

The illustrative embodiments can also create a mapping of the query to a location of the result set in the shared cache. As result, the illustrative embodiments can provide a technical effect of increasing performance in processing queries by storing result sets in a shared cache that can be accessed by a group of clients using a mapping in which the shared cache can be located on a client-side or server-side. The illustrative embodiments, when the first client in a client device has the shared cache, can send the second client a client identifier to the first client having the shared cache, wherein the second client requests the result set from the first client, when the first client and the client device has the shared cache. As result, the illustrative embodiments can provide a technical effect of increasing performance in processing queries by storing result sets in a shared cache that can be accessed by a group of clients in which the shared cache can be located on a client-side. The illustrative embodiments, when a database server processing the query in a server computer has the shared cache can send the result set from the shared cache in the server computer to the second client. As result, the illustrative embodiments can provide a technical effect of increasing performance in processing queries by storing result sets in a shared cache that can be accessed by a group of clients in which the shared cache can be located on the server-side.

The illustrative embodiments, when the first client in a client device has the shared cache, can create a hash value using the query received from the second client; determine a location of the result set from a hash table of result set locations using the hash value; and send a client identifier to a client having the shared cache as the location of the result set to the second client. As result, the illustrative embodiments can provide a technical effect of increasing performance in processing queries by storing result sets in a shared cache that can be accessed by a group of clients in which the shared cache can be located on a client-side that can be accessed using a hash table containing result set locations.

The illustrative embodiments can also receive a second query from the second client in the group of clients; determine whether the result set in the shared cache is a partial match to the second query; retrieve the result set from the shared cache in response to the result set being the partial match to the second query, wherein the result set is a first result set; and retrieve a second result set from a database, wherein the second result set and the first result set are a full match to the second query; combine the first result set and the second result set to form a complete result set; and send the complete result set to the second client. As result, the illustrative embodiments can provide a technical effect of increasing performance in processing queries by storing result sets in a shared cache that can be accessed when the result sets are partial matches to queries. The illustrative embodiments can also receive a second query from the second client in the group of clients; determine whether the result set in the shared cache is a partial match to the second query; determine whether retrieving the result set from the shared cache provides better a performance than retrieving the result set from a database in response to the result set being the partial match to the second query; retrieve the result set from the shared cache in response to a determination that retrieving the result set from the shared cache provides better the performance than retrieving the result set from the database, wherein the result set retrieved from the shared cache is a first result set; retrieve a second result set from the database, wherein the second result set and the first result set are a full match to the second query; combine the first result set and the second result set to form a complete result set; and send the complete result set to the second client. As result, the illustrative embodiments can provide a technical effect of increasing performance in processing queries by storing result sets in a shared cache that can be accessed when the result sets are partial matches to queries and using the share cache provides increased performance.

The illustrative embodiments can also send the result set identified from processing the query to the group of clients. As a result, the illustrative embodiments can provide a technical effect of increasing performance in processing queries by storing result sets in a shared cache that can be accessed by a group of clients in which the shared cache can be located on a client-side or server-side in which the shared cache is not required to used.

DETAILED DESCRIPTION

Figure 1:
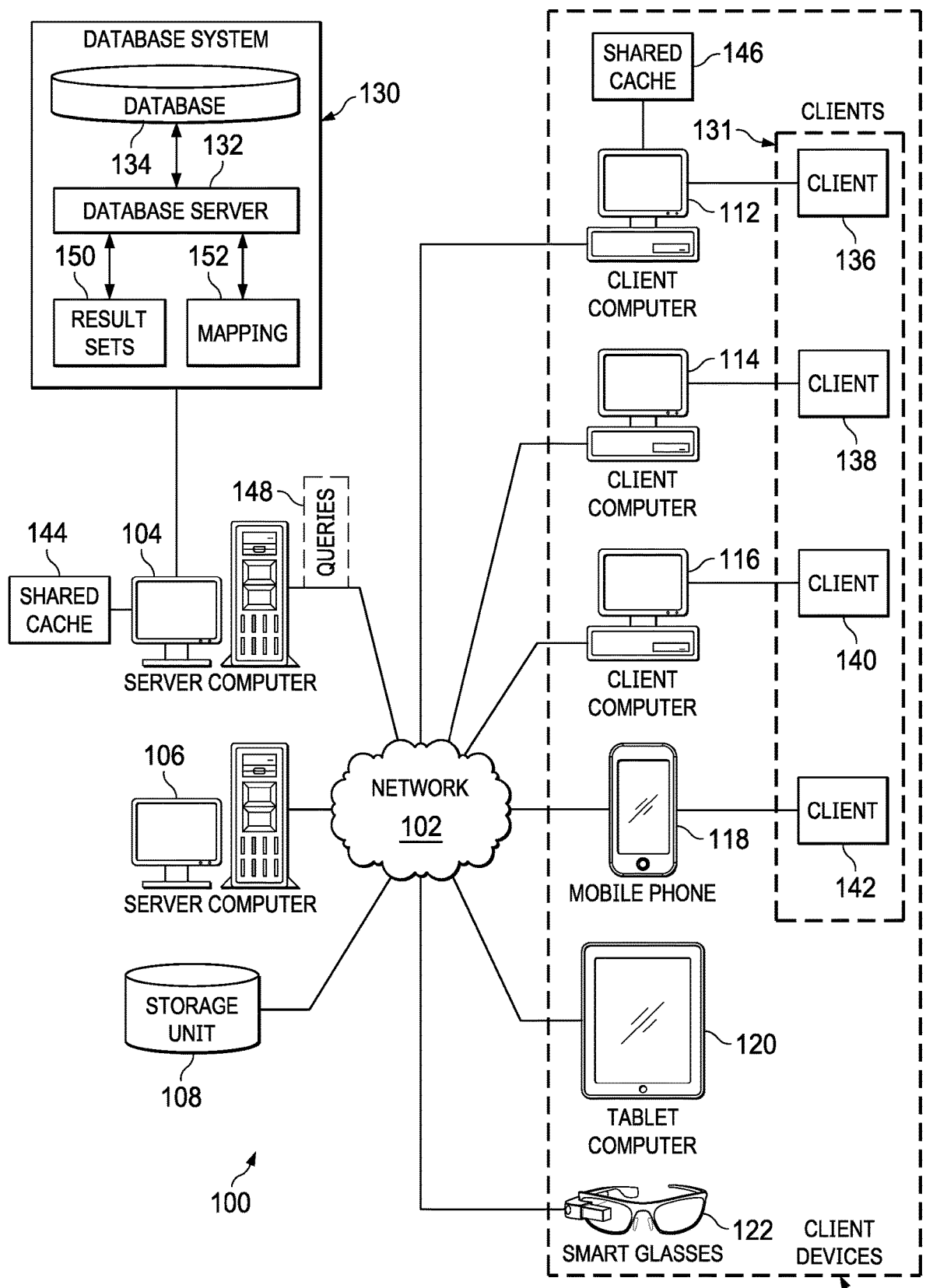
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that it would be desirable to have a method and apparatus that take into account at least some of the issues discussed above, as well as other possible issues. For example, it would be desirable to have a method and apparatus that overcome an issue performance in retrieving information from databases.

The illustrative embodiments recognize and take into account that client-side solutions for improving database performance can become more feasible with the increases in memory and processing resources located on client computers. The illustrative embodiments recognize and take into account that with the resource increases in client computers increased amount of work can be performed on the client-side. For example, the illustrative embodiments recognize and take into account that local cache memories and complex computations can be performed on a client computer.

Thus, the illustrative embodiments provide a computer implemented method, apparatus, system, and computer program product for accelerating the process for retrieving search results. The retrieval of search results in response to a query from a requester. As used herein, fetching can be any operation or command that reads data from a database and is not meant to be limited to a particular type of database system.

In one illustrative example, a computer implemented method processes a query. A number of processor units processes the query to identify a result set in response to receiving the query from a first client. The number of processor units stores, the result set in a shared cache assigned to a group of clients, wherein result set stored in the shared cache is accessible by the group of clients. The number of processor units returns the result set to a second client in the group of clients from the shared cache in response to receiving the query from the second client in the group of clients.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. In this example, client devices 110 are hardware that can process information. For example, client devices 110 can be hard work containing processor units.

As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, database system 130 is located in server computer 104 and can be accessed for by clients 131 in client devices 110 to obtain information. As depicted, database system 130 comprises database server 132 and database 134.

For example, clients 131 can send requests for information to database system 130 in the form of queries. As depicted clients 131 comprises client 136, client 138, client 140, and client 142. These clients are software located on a number of client devices 110. In this illustrative example, client 136 is located in client computer 112; client 138 is located in client computer 114; client 140 is located in client computer 116; and client 140 is located in mobile phone 118.

In this illustrative example, database server 132 can group clients 131 into different groups and manage those groups. For example, client 136, client 138, and client 140 are a first group while client 142 is in a second group. This example, the clients in the first group may belong to a first company or department while the client in the second group belongs to a second company or department. These assignments can also be made based on other various criteria such organization, geographic location, industry, job title, project assignment, or other suitable factors for controlling access to result sets stored in the shared caches.

With these groups, database server 132 can manage the sharing of search results using shared caches. These shared caches can be server-side or client-side. In this illustrative example, shared cache 144 is a server-side cache in server computer 104. As another 112, shared cache 146 is a client-side cache in client computer 112.

When database server 132 to receives queries 148 from clients 131, database server 132 processes those queries by searching database 134 this illustrative example. The search results returned from searching database 134 form result sets 150. A result set and result sets 150 comprises one or more search results. In this illustrative example, result sets 150 can stored in at least one of shared cache 144 or shared cache 146.

Database server 132 can assign caches to groups of clients. For example, shared cache 146 can be assigned to the first group comprising client 136, client 138, and client 140. These clients are able to access result sets 150 stored in shared cache 146. In another example, shared cache 144 can be assigned to the second group comprising client 142. Client 142 in the second group can access result sets 150 stored in shared cache 144.

With this example, any client in the first group can access a search result in shared cache 146. However, the client in second group is unable to access shared cache 146 even if client 142 generates a query matching the result set stored in shared cache 146. In similar fashion, the clients and first group are unable to access shared cache 144. As a result, access controls can be for result sets stored in shared caches.

In this illustrative example, database server 132 creates mapping 152 to map queries 148 to result sets 150 stored in a shared cache. This mapping identifies result sets 150 and the corresponding queries matching result sets 150. Further, mapping 152 also identifies locations of result sets 150 in the shared caches.

If a result set is in shared cache 144 in server computer 104, mapping 152 can include a pointer to a memory location where the result set is located in shared cache 144. As another example, if the result set is located in shared cache 146 in client computer 112, mapping 152 can include a client identifier identifying client 136 in client computer 112 as having shared cache 146.

For example, a result set in result sets 150 is generated in response to a query in queries 148 and stored in shared cache 146. Database server 132 can create an entry in mapping 152 that comprises an identification of the query and a location of the result set matching the query.

When a client, such as client 138, sends the query to database server 132, database server 132 can check mapping 152 to determine whether the query matches a result set in shared cache 146 using mapping 152. If a result set in shared cache 146 matches the query, database server 132 can determine whether client 138 is in the first group that can access the result set. If client 138 is in the first group, database server 132 returns the result set by sending client 138 identification of client 136 in client computer 112 as the client having shared cache 146 containing the result set matching the query. The identifier can be an address to client computer 112 in which client 138 is located.

In this example, client 138 can then request the result set from shared cache 146 by sending a request to client 138. The request can be made using various interface mechanisms such as a remote procedure call (RPC) interface, an application programming interface (API) interface, or some other suitable interface. In some illustrative examples, client computer 112 can perform an additional check to determine whether client 138 is in the first group before returning the result set from shared cache 146 to client 138.

However, if a client, such as client 142, is not in the is not in the first group, then database server 132 does not return the identification of client computer 112 because client 142 does not have permission to access shared cache 146. In this case, database server 132 processes the query by searching database 134 to obtain the result set that matches the query and return the result set to client 142.

In yet another example, the same result set with the query can be stored in both shared cache 146 and shared cache 144 in which client 142 is part of the second group that has access to shared cache 144 but not to shared cache 146. In this example, database server 132 identifies the result set matching the query as being located in both shared cache 144 and shared cache 146.

Database server 132 determines whether client 142 is in a group having access to either of the shared caches. In this example, client 142 is in a second group having access to shared cache 144. As a result, database server 132 returns the result set in shared cache 144 identified in mapping 152 to client 142. Thus, database server 132 enables access control of result sets 150 stored in different shared caches with respect to access by clients 131.

In another illustrative example, database server 132 can provide pipelining of result sets 150 to clients 131. Pipelining involves sending a result set to all of the clients in a group in response to one of the clients in the group sending a query even though the other clients in the group did not send the query. This feature can be used to anticipate situations in which the clients in a group make identical queries.

For example, when client 136 in the first group sends a query to database server 132, database server 132 can identify a result set based on searching database 134. Database server 132 sends the result set to client 136 as a response to the query sent by client 136. Additionally, database server 132 can also send this result set to each client in the first group. In this depicted example, the result set is also sent to client 138, and client 140. As a result, database server 132 can pipeline result sets to different groups of clients 131 concurrently through the grouping of clients 131.

Thus, the use of shared caches located in a computing device such as a server computer or a client device, increase performance can be achieved by returning result sets using result set stored in the shared caches from previous queries rather than processing the query by searching database 134. This feature of returning of a result set from a shared cache reduces the use of processor resources used to return search results from database 134. This feature can also reduce the number of input/output (I/O) operations needed to fetch results from database 134 to form the result set.

Figure 2:
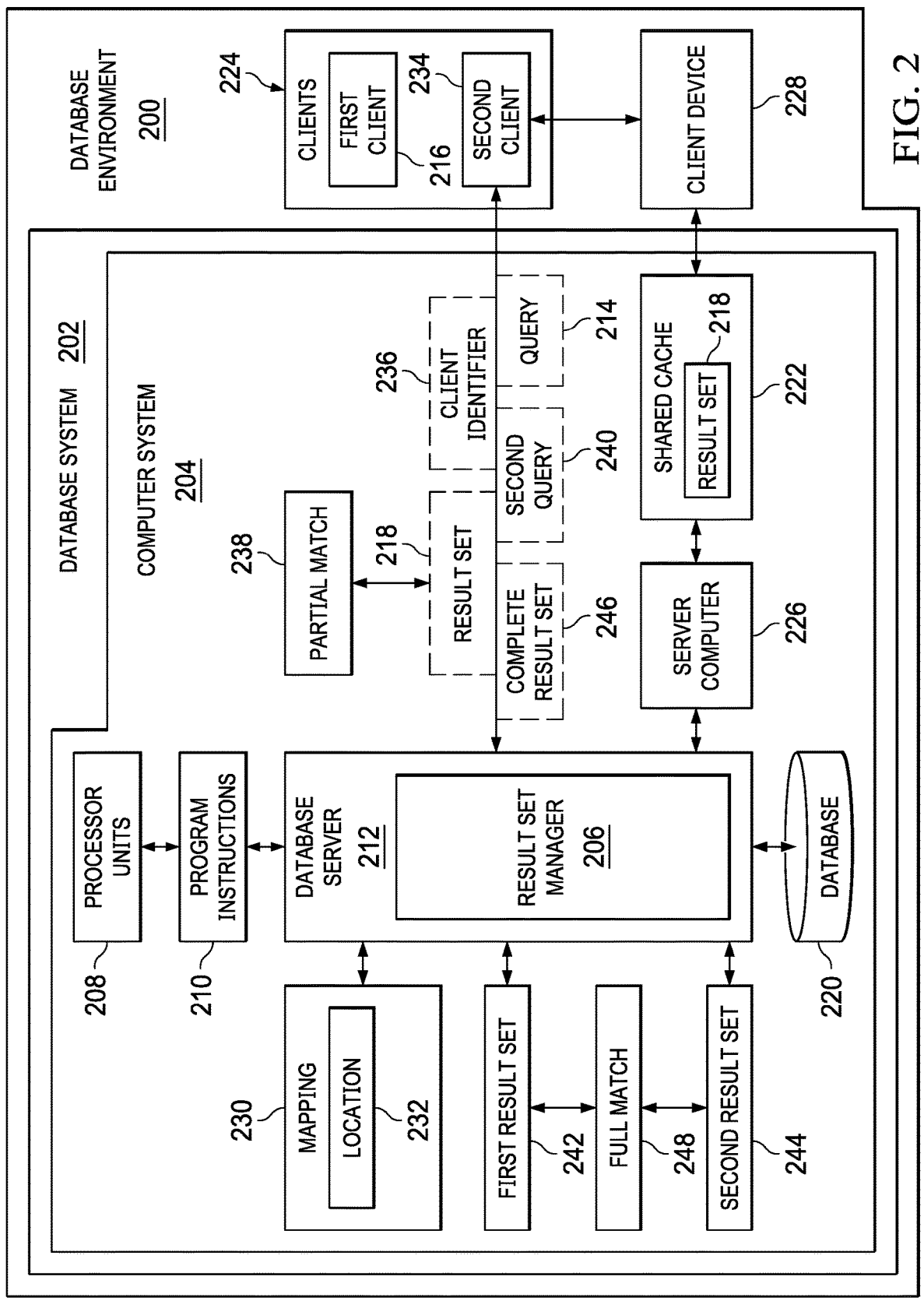
FIG. 2 is a block diagram of a database environment in accordance with an illustrative embodiment.

With reference now to FIG. 2, a block diagram of a database environment is depicted in accordance with an illustrative embodiment. In this illustrative example, database environment 200 includes components that can be implemented in hardware such as the hardware shown in network data processing system 100 in FIG. 1.

In this illustrative example, the performance in retrieving information from databases increased as compared to current systems using database system 202. As depicted, database system 202 comprises computer system 204 and result set manager 206.

Result set manager 206 can be implemented in software, hardware, firmware or a combination thereof. When software is used, the operations performed by result set manager 206 can be implemented in program instructions configured to run on hardware, such as a processor unit. When firmware is used, the operations performed by result set manager 206 can be implemented in program instructions and data and stored in persistent memory to run on a processor unit. When hardware is employed, the hardware can include circuits that operate to perform the operations in result set manager 206.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes a number of processor units 208 that are capable of executing program instructions 210 implementing processes in the illustrative examples. As used herein a processor unit in the number of processor units 208 is a hardware device and is comprised of hardware circuits such as those on an integrated circuit that respond and process instructions and program code that operate a computer. When a number of processor units 208 execute program instructions 210 for a process, the number of processor units 208 is one or more processor units that can be on the same computer or on different computers. In other words, the process can be distributed between processor units on the same or different computers in a computer system. Further, the number of processor units 208 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Result set manager 206 can be implemented as a component in database server 212 in computer system 204. In other illustrative examples, result set manager 206 can be a separate component in computer system 204 that communicates with database server 212.

In this illustrative example, result set manager 206 receives query 214 from first client 216. Result set manager 206 processes query 214 to identify result set 218 in response to receiving query 214 from first client 216. In this example, the processing of query 214 includes using query 214 to search database 220 to obtain search results for result set 218.

As depicted, result set manager 206 stores result set 218 in shared cache 222 assigned to a group of clients 224. In this illustrative example, result set 218 stored in shared cache 222 is accessible by a group of clients 224. Shared cache 222 is located in hardware. For example, shared cache 222 can be a portion of a block of memory or a dedicated memory device.

As used herein, a "group of" when used with reference items means one or more items. For example, a group of clients 224 is one or more of clients 224.

In this manner, the assignment of shared cache 222 to the group of clients 224 enables managing access to result set 218. For example, a group of clients 224 can be clients 224 grouped based on an organization, a department, a building, a project, a clearance level, or some other type of criteria for grouping clients 224. As a result, other clients outside of the group clients 224 are unable to access result set 218 even if those clients submit query 214 to result set manager 206.

In this illustrative example, result set manager 206 returns result set 218 to first client 216 in the group of clients 224. Result set 218 can be returned directly from memory where result set 218 is located prior to being stored in shared cache 222. In another illustrative example, result set 218 can be returned from shared cache 222.

Shared cache 222 can be in a number of different locations. For example, shared task can be in one of server computer 226 and client device 228. In this example, database server 212 is in server computer 226. One or more of clients 224 can be in client device 228. In other words, shared cache 222 can be located on a server side such as server computer 226 or on client side such as client device 228.

Additionally, result set manager 206 creates mapping 230 of query 214 to location 232 of result set 218 in shared cache 222. In this illustrative example, mapping 230 can be used to retrieve result set 218 from shared cache 222.

In this illustrative example, result set manager 206 returns result set 218 to second client 234 in the group of clients 224 from shared cache 222 in response to receiving the query 214 from second client 234 in the group of clients 224. When shared cache 222 is located in client device 228, result set manager 206 sends second client 234 client identifier 236 to first client 216 having shared cache 222. Client identifier 326 can be an address to the location of client device 228 in which first client 216 is located.

In this example, second client 234 requests result set 218 from first client 216. This type of request can be made using a remote procedure call (RPC) in the illustrative example. In another example, when shared cache 222 is located in server computer 226, result set manager 206 can send second client 234 result set 218 from shared cache 222 in server computer 226.

In yet another example, result set 218 can be a partial match 238 to second query 240 and can be used to reduce the use processing resources even though result set in shared cache 146 is a partial match 238 to second query 240. For example, in response to receiving second query 240 from second client 234, result set manager 206 can determine whether result set 218 in shared cache 222 is partial match 238 to second query 240. When result set 218 is partial match 238, result set manager 206 determines whether retrieving result set 218 from shared cache 222 provides better a performance than retrieving result set 218 from database 220 in response to result set 218 being the partial match 238 to second query 240.

In this illustrative example, result set manager 206 retrieves result set 218 from shared cache 222 in response to a determination that retrieving result set 218 from shared cache 222 provides better performance than retrieving result set 218 from database 220. In this example, result set 218 retrieved from 222 shared cache is first result set 242. Result set manager 206 retrieves second result set 244 from database 220. In this depicted example, second result set 244 and first result set 242 are full match 248 to second query 240. Result set manager 206 combines first result set 242 and second result set 244 to form complete result set 246. Result set manager 206 returns complete result set 246 to second client 234. In some illustrative examples, the determination as to whether retrieving result set 218 from shared cache 222 provides better performance can be an optional feature.

As a result, the amount of processing resources used to return result set 218 to second client 234 is reduced as compared to returning result set 218 first client 216 through accessing database 220. As a result, receiving query 214 at subsequent times improve the performance of computer system 204, reducing the use of processor resources. As result, result set 218 can be returned in less time because access to database 220 is unnecessary.

In one illustrative example, one or more technical solutions are present that overcome a technical problem with processing queries with the desired level of performance. As a result, one or more technical solutions in the illustrative examples can provide a technical effect that improve the performance in retrieving result sets from a database. In one illustrative example, one or more solutions are present in which shared caches can be used to provide a technical effect that reduces the amount of processing resources used in a server computer in which a database server is located. Further, the number of input/output (I/O) operations needed to return results is reduced.

The illustrative examples and increase performance in the processing and database queries as compared to current techniques. Further, the illustrative examples can also reduce the amount of stress or searching performed in databases. Additionally, in the illustrative example, processing tasks can be offloaded to client on another computer where the client stores and returns result sets responsive to queries from clients in the same group. The illustrative examples also enable sending a result set to the entire group of clients in response to a single client in the group sending a query.

Computer system 204 can be configured to perform at least one of the steps, operations, or actions described in the different illustrative examples using software, hardware, firmware or a combination thereof. As a result, computer system 204 operates as a special purpose computer system in which result set manager 206 in computer system 204 enables with increased performance through using less database searching. In particular, result set manager 206 transforms computer system 204 into a special purpose computer system as compared to currently available general computer systems that do not have result set manager 206.

In the illustrative example, the use of result set manager 206 in computer system 204 integrates processes into a practical application for method for processing queries in a manner that increases the performance of computer system 204. In other words, result set manager 206 in computer system 204 is directed to a practical application of processes integrated into result set manager 206 in computer system 204 that processes a query to identify a result set in response to receiving the query from a first client. The result set is stored in a shared cache assigned to a group of clients. The result set stored in the shared cache is accessible by the group of clients but not by other clients outside of the group. In response to receiving the query from a second client in the group clients, the result set is sent to the second client from the shared cache instead of performing the same search in the database.

In this manner, result set manager 206 in computer system 204 provides a practical application of query searching that the functioning of computer system 204 is improved. The illustrative example includes reducing the use of processor resources in a server computer needed to process queries.

Additionally, the illustrative example can also increase the speed at which result sets are returned in response to processing queries.

Figure 3:
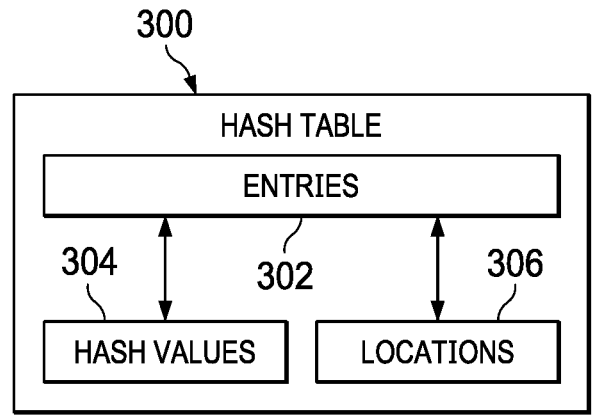
FIG. 3 is a block diagram of hash table for mapping result sets in accordance with an illustrative embodiment.

Turning next to FIG. 3, a block diagram of hash table for mapping result sets is depicted in accordance with an illustrative embodiment. In this illustrative example, hash table 300 is an example one manner in which mapping 230 shown in block form FIG. 2 can be implemented.

In this illustrative example, entries 302 comprises hash values 304 and locations 306. Hash values 304 indexes into entries 302 and hash table 300. In this illustrative example, a query can be hashed to obtain a hash value that can be used to identify an entry in entries 302. The location in the entry identifies the location of the result set corresponding to the query used to generate the has value. In this illustrative example, the location can be a memory location of the result set in a shared cache when the shared cache is located on the same computer as database server 212. When the location of the result set is in a shared cache on a client device, the location is a client identifier to the client device.

The illustration of database environment 200 in the different components in FIG. 2 and FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, result set manager 206 when implemented as a separate component from database server 212 can manage result sets for other database servers in other database systems. As another example, one or more shared caches can be present in addition to or in place of shared cache 222. These additional shared caches can be located in at least one of a server computer or a client device. As another example, result sets stored in shared caches can be invalidated after some period of time. Further, a result set in a shared cache can be invalidated when the underlying data for the result set in the database is changed or updated. This update can be performed by removing cash entry for the query from a mapping, such as mapping 230.

Figure 4:
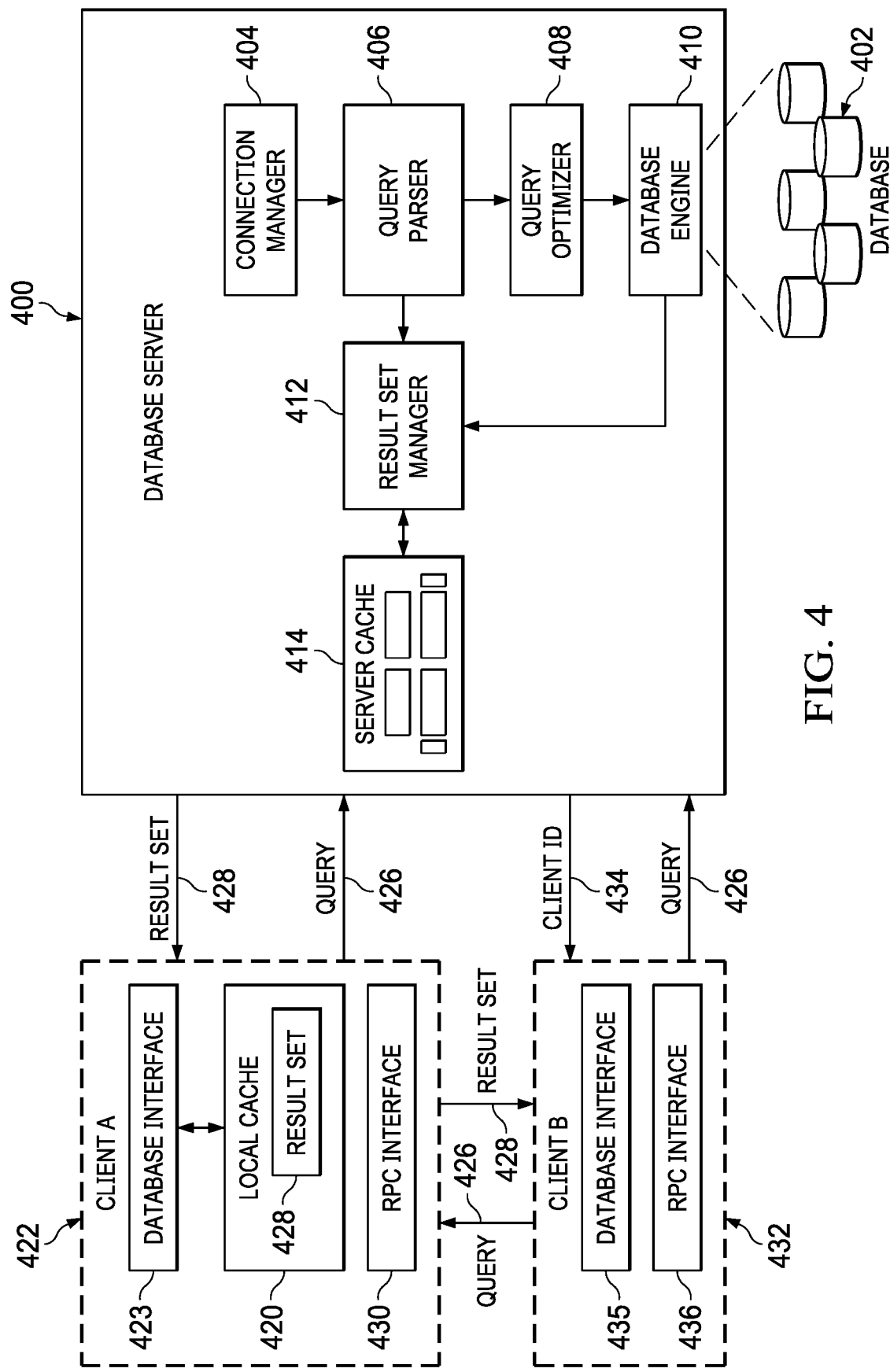
FIG. 4 is a data flow diagram for processing a query in accordance with an illustrative embodiment.

With reference to FIG. 4, a data flow diagram for processing a query is depicted in accordance with an illustrative embodiment. As depicted, database server 400 can access database 402 when processing queries from requestors. Database server 400 and database 402 are an example of components such as database server 212 and database 220 that can be used in database system 202 in FIG. 2.

In this depicted example, database server 400 comprises a number of different components. As depicted, database server 400 includes connection manager 404, query parser 406, query optimizer 408, database engine 410, and result set manager 412.

In this example, connection manager 404 handles communications with clients. Query parser 406 processes the string in a query to place it into a format for searching database 402. Query optimizer 408 identifies different access paths that can be used to process the query and selects one path to optimize processing of the query. Database engine 410 is a component that can process the optimized query from query optimizer 408 to perform operations on database 402. These operations include, for example, create, read, update, and delete. When the query is a search for information in database 402, the search results are returned to result set manager 412 and a result set.

Result set manager 412 manages the result set received from database engine 410. For example, result set manager 412 can store the result set in a number of shared caches such as server cache 414, which is a serve side cache. As another example, the result set can be stored in local cache 420 for Client A 422.

In this illustrative example, Client A 422 can establish a connection to connection manager 404 using database (DB) interface 423. Client A 422 can send query 426 to connection manager 404 in database server 400 over this connection. Result set manager 412 can return result set 428 to Client A 422 over the connection.

In one illustrative example, result set manager 412 can store result set 428 in server cache 414. However, if insufficient space is present in server cache 414, result set 428 can be stored in local cache 420 for Client A 422 when Client A 422 enables local cache sharing.

In this case, result set manager 412 does not store result set 428 in server cache 414. Instead, result set manager 412 registers result set 428 as being cached on the client-side in local cache 420. In this example, result set manager 412 stores the address to Client A 422. In this example, the address is the address for the client device in which Client A 422 is located. This address can be stored in server cache 414 and can be accessed in server cache 414 using a mapping such as a hash table.

With result set 428 being stored in local cache 420, other clients and result set manager 412 can access local cache 420 to retrieve result set 428. In this example, the access can be obtained using an interface such as remote procedure call (RPC) interface 430 for Client A 422.

For example, Client B 432 sends query 426 to connection manager 404 using DB interface 435. Query 426 is sent to result set manager 412, which determines that Client B 432 in the same group as Client A 422. In this example, result set 428 for query 426 is located in local cache 420 in Client A 422. In this case, result set manager 412 returns client ID 434 to Client B 432. Client ID 434 is an address to the client device in which Client A 422 having local cache 420 is located.

In response to receiving client ID 434, Client B 432 can send query 426 to RPC interface 430 in Client A 422 from RPC interface 436 in Client B 432. In response, Client A 422 returns result set 428 from local cache 420 to Client B 432. The storing of result set 428 in local cache 420 or server cache 414 can reduce the amount of processor resources needed to return result set 428 in response to query 426 received at a subsequent time from Client B 432 or another client.

Figure 5:
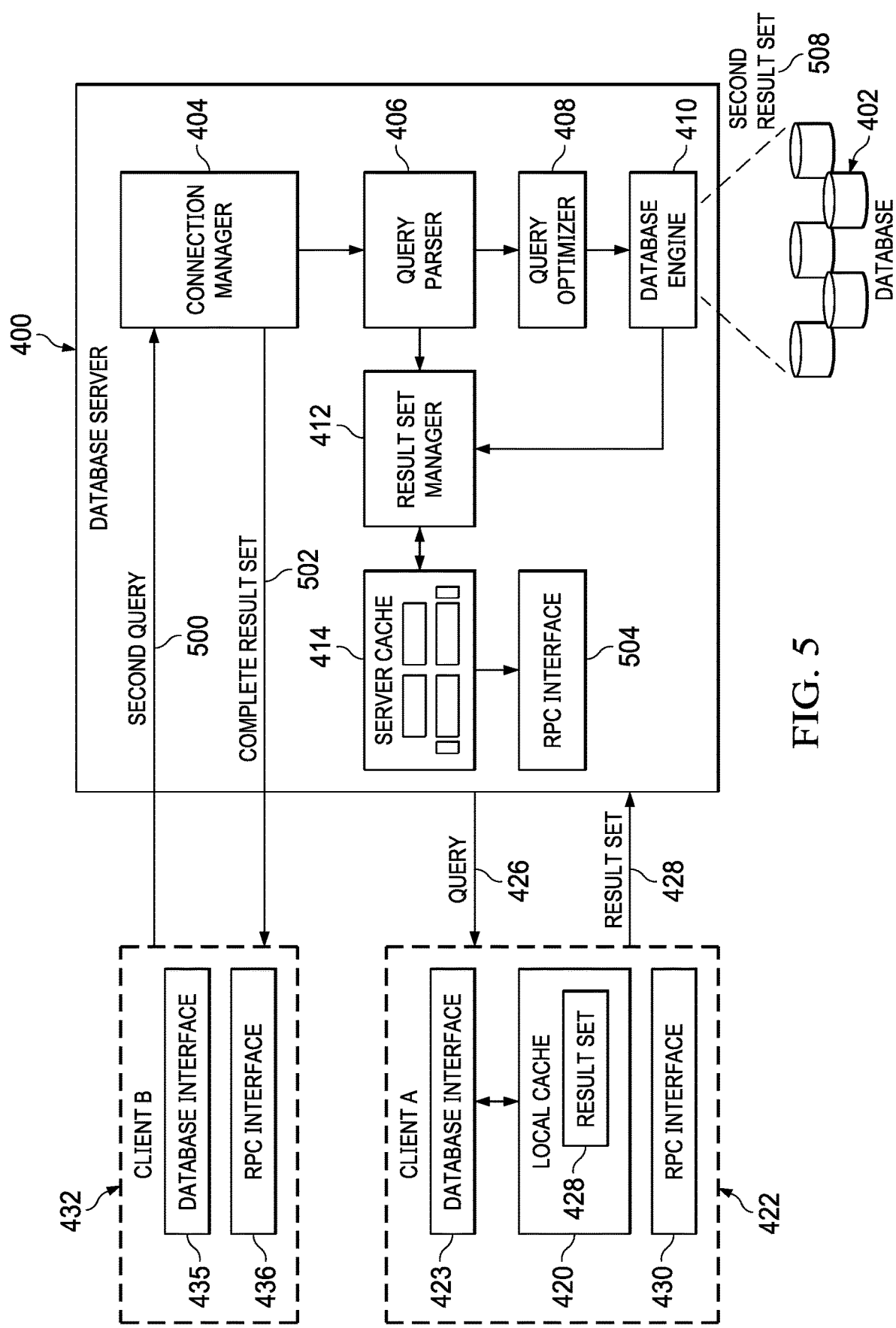
FIG. 5 is a data flow diagram for processing a partial match to a query is depicted in accordance with an illustrative embodiment.

With reference next to FIG. 5, a data flow diagram for processing a partial match to a query is depicted in accordance with an illustrative embodiment. In the illustrative examples, the same reference numeral may be used in more than one figure. This reuse of a reference numeral in different figures represents the same element in the different figures. Further, the reuse of a reference numeral a same figure represents the same element in locations in the same figure. The locations may be occupied by the element at different times.

In this example, Client B 432 sends second query 500 to database server 400 through a connection between RPC interface 436 in Client B 432 and connection manager 404 in database server 400. In this illustrative example, result set manager 412 determines that result set 428 in local cache 420 for Client A 422 is a partial match for second query 500. The partial match can be determined by comparing query 426 corresponding to result set 428 to second query 500. In this example query 426 is a match to a portion of second query 500. As a result, result set 428 a partial match that can be used in creating complete result set 502 that is responsive to second query 500. In this case, result set manager 412 sends query 426 from RPC interface 504 to RPC interface 430 in Client A 422. In response Client A 422 returns result set 428 from local cache 420.

Result set manager 412 uses the portion of second query 500 not matched to query 426 to search database 402. Result set manager 412 receives second result set 508 from database 402. Result set manager 412 combines result set 428 and second result set 508 with each other to form complete result set 502 that is a full match for second query 500 and returns this complete result set to Client B 432.

In another illustrative example, result set manager 412 can determine whether retrieving result set 428 from local cache 420 provides better performance than retrieving result set 428 from database 402 in response to result set 428 being the partial match to second query 500. If retrieving result set 428 from local cache 420 provides better performance, result set manager 412 retrieves result set 428 from local cache 420. Otherwise, result set manager uses second query 500 to obtain complete result set 502 from database 402.

Figure 6:
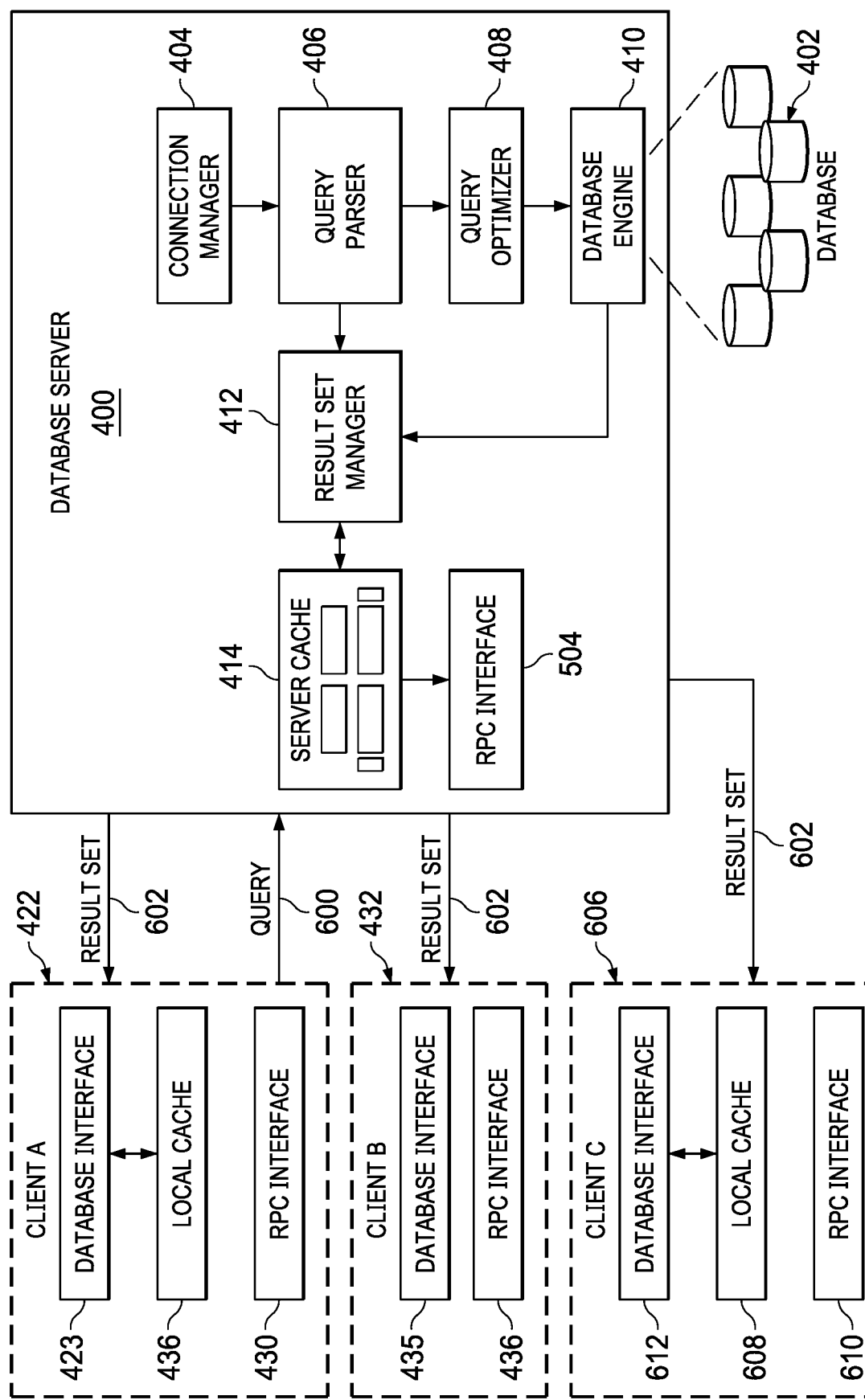
FIG. 6 is data flow diagram illustrating pipelining of these result set in accordance with an illustrative embodiment.

With reference to FIG. 6, data flow diagram illustrating pipelining of these result set is depicted in accordance with an illustrative embodiment. In this depicted example, Client A 422 sends query 600 to database server 400. Result set manager 412 receives result set 602 from database 402. Result set manager 412 returns result set 602 to Client A 422.

In this illustrative example, Client A 422, Client B 432, and Client C 606 are in a group. This group can be defined for sharing local cache 420 in Client A 422 and local cache 608 in Client C 606. Additionally, this group can be defined as a query group for pipelining or distributing result set 428. In addition to returning, result set 602 Client A 422, result set manager 412 can send result set 602 to other members of the group.

In this example, result set manager 412 sends result set 602 to Client B 432 and to Client C 606 using RPC interface 504.

As depicted, result set 602 is sent from RPC interface 504 to RPC interface 436 in Client B 432. Additionally, result set 602 is sent from RPC interface 504 to RPC interface 610 in Client C 606. In this example, the sending of result set 602 does not involve DB interface 435 in Client B 432 or DB interface 612 in Client C 606. Further, in some illustrative examples the group does not have to be defined for both cache sharing and pipelining of results. For example, the group may only be defined for pipelining results without cache sharing.

As a result, in cases where multiple clients run the same queries, distributed to those clients without having the clients send queries. In this case, reduce processing curries also occurs in addition a lower use of input/output resources and bandwidth.

The data flow diagrams illustrated in FIGS. 4-6 are provided as examples of some implementations for data flow in a database system. These examples are not meant to limit the manner in which other illustrative examples can be implemented. For example, in another illustrative example, one or more database servers can be present that can store result sets in the different clients. As another illustrative example, two or more groups of clients can be managed using the same data flow in addition to the single group depicted in these examples. As another example, the components illustrated in database server 400 are only examples of components that may be used not meant to limit the manner in which other database servers can be plummeted.

Figure 7:
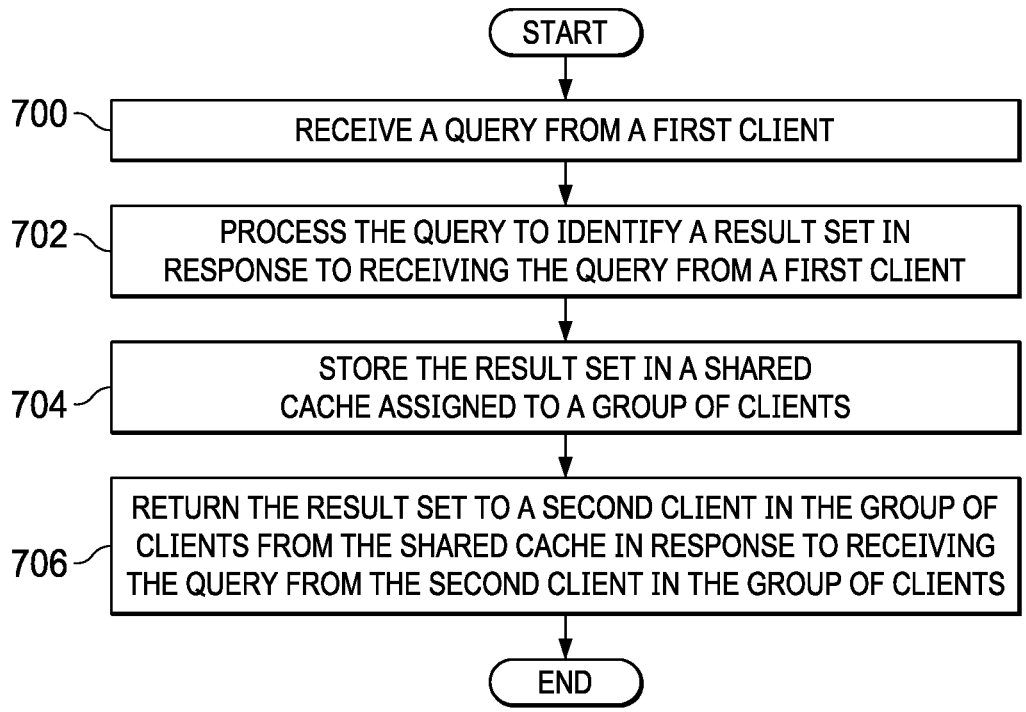
FIG. 7 is a flowchart of a process for processing a query in accordance with an illustrative embodiment.

Turning next to FIG. 7, a flowchart of a process for processing a query is depicted in accordance with an illustrative embodiment. The process in FIG. 7 can be implemented in hardware, software, or both. When implemented in software, the process can take the form of program instructions that is run by one of more processor units located in one or more hardware devices in one or more computer systems. For example, the process can be implemented in result set manager 206 in computer system 204 in FIG. 2.

The process by receiving a query from a first client (step 700). The process processes the query to identify a result set in response to receiving the query from a first client (step 702). The process stores the result set in a shared cache assigned to a group of clients (step 704). In step 704, the set stored in the shared cache is accessible by the group of clients.

The process returns the result set to a second client in the group of clients from the shared cache in response to receiving the query from the second client in the group of clients (step 706). The process terminates thereafter.

Figure 8:
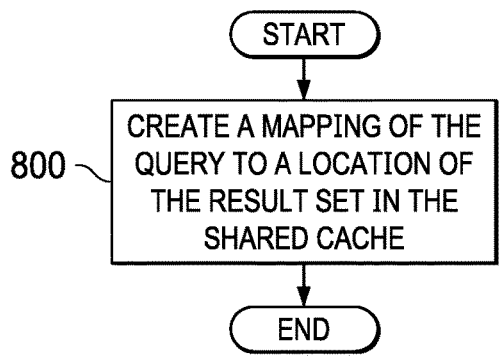
FIG. 8 is a flowchart of a process for processing a query in accordance with an illustrative embodiment.

Turning to FIG. 8, a flowchart of a process for processing a query is depicted in accordance with an illustrative embodiment. FIG. 8 is an example of an additional step that can be performed in processing query with the steps in FIG. 7.

The creates a mapping of the query to a location of the result set in the shared cache (step 800). The process terminates thereafter. In illustrative example, this. mapping enables a result set manager to identify the location of the results set in a cache.

Figure 9:
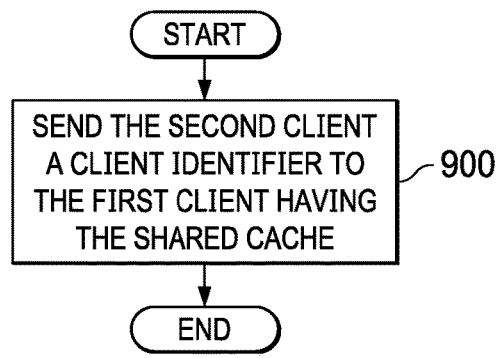
FIG. 9 is a flowchart of a process for returning a result set in accordance with an illustrative embodiment.

With reference now to FIG. 9, a flowchart of a process for returning a result set is depicted in accordance with an illustrative embodiment. The process in FIG. 9 is an example of an implementation for step 706 in FIG. 7. In this example, the first client in a client device has the shared cache.

The process sends the second client a client identifier to the first client having the shared cache (step 900). The process terminates thereafter. The second client requests the result set from the first client using the client identifier received in step 900. This illustrative example, the client identifier can be an address to the client device in which the first client is located. The client identifier can also include a client name or other identifier in addition to the address.

Figure 10:
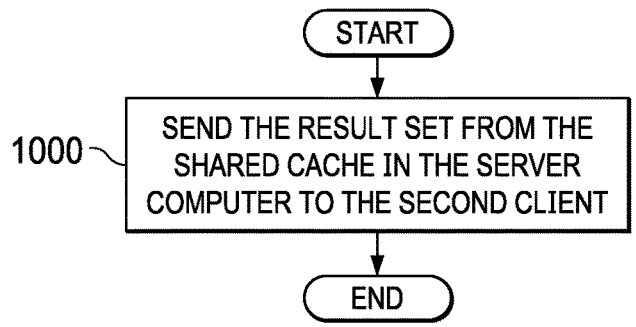
FIG. 10 is a flowchart of a process for returning a result set in accordance with an illustrative embodiment.

In FIG. 10, a flowchart of a process for returning a result set is depicted in accordance with an illustrative embodiment. The process in FIG. 10 is an example of an implementation for step 706 in FIG. 7. In this example, a database server processing the query in a server computer has the shared cache.

The process sends the result set from the shared cache in the server computer to the second client (step 1000). The process terminates thereafter.

Figure 11:
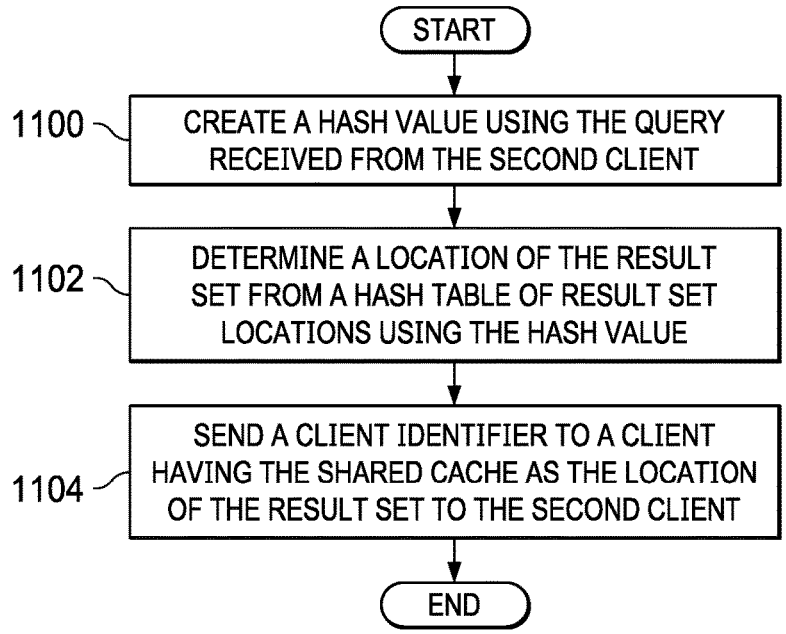
FIG. 11 another flowchart of a process for returning a result set using a hash value in accordance with an illustrative embodiment.

Turning now to FIG. 11, another flowchart of a process for returning a result set using a hash value is depicted in accordance with an illustrative embodiment. The process in FIG. 11 is an example of an implementation for step 706 in FIG. 7. In this example, a client in a client device has shared cache is located in a client device.

The process begins by creating a hash value using the query received from the second client (step 1100). The process determines a location of the result set from a hash table of result set locations using the hash value (step 1102).

The process sends a client identifier to a client having the shared cache as the location of the result set to the second client (step 1104). The process terminates thereafter.

Figure 12:
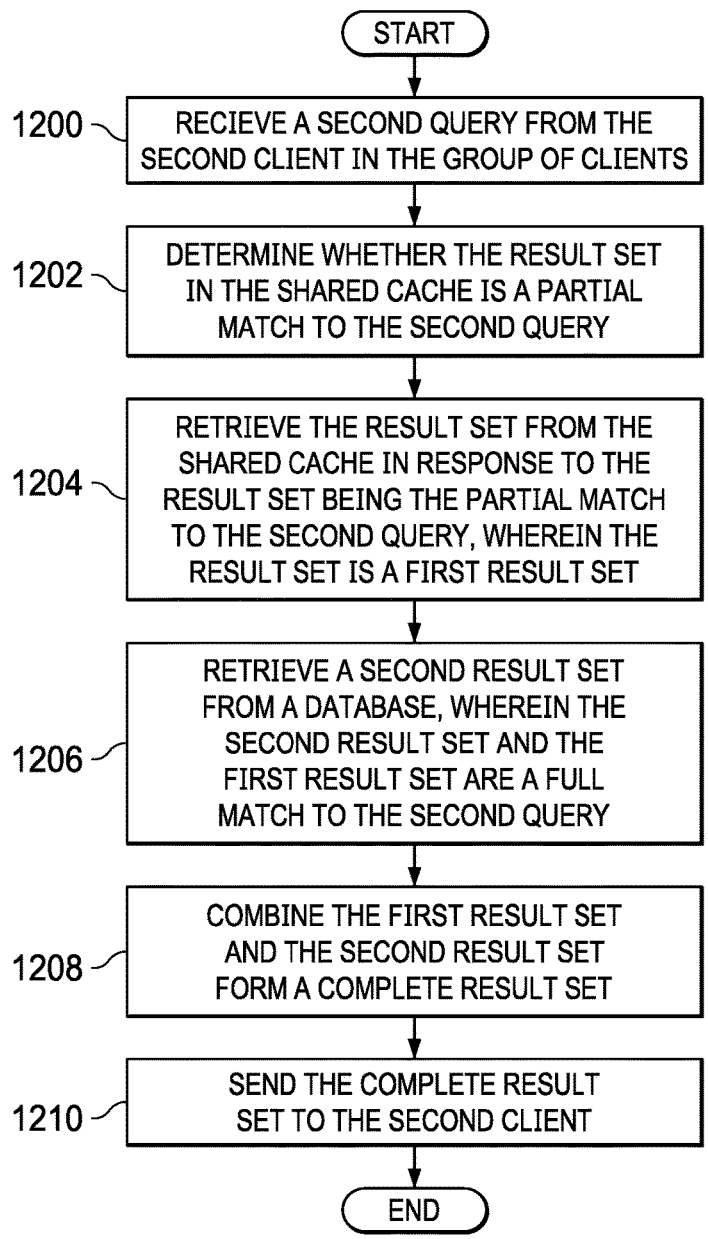
FIG. 12 is a flowchart of a process for processing a query in accordance with an illustrative embodiment.

With reference next FIG. 12, a flowchart of a process for processing a query is depicted in accordance with an illustrative embodiment. FIG. 12 is an example of additional steps that can be performed in processing query with the steps in FIG. 7.

The process begins by receiving a second query from the second client in the group of clients (step 1200). The process determines whether the result set in the shared cache is a partial match to the second query (step 1202).

The process retrieves the result set from the shared cache in response to the result set being the partial match to the second query, wherein the result set is a first result set (step 1204). The process retrieves a second result set from a database, wherein the second result set and the first result set are a full match to the second query (step 1206).

The process combines the first result set and the second result set to form a complete result set (step 1208). The process sends the complete result set to the second client (step 1210). The process terminates thereafter.

Figure 13:
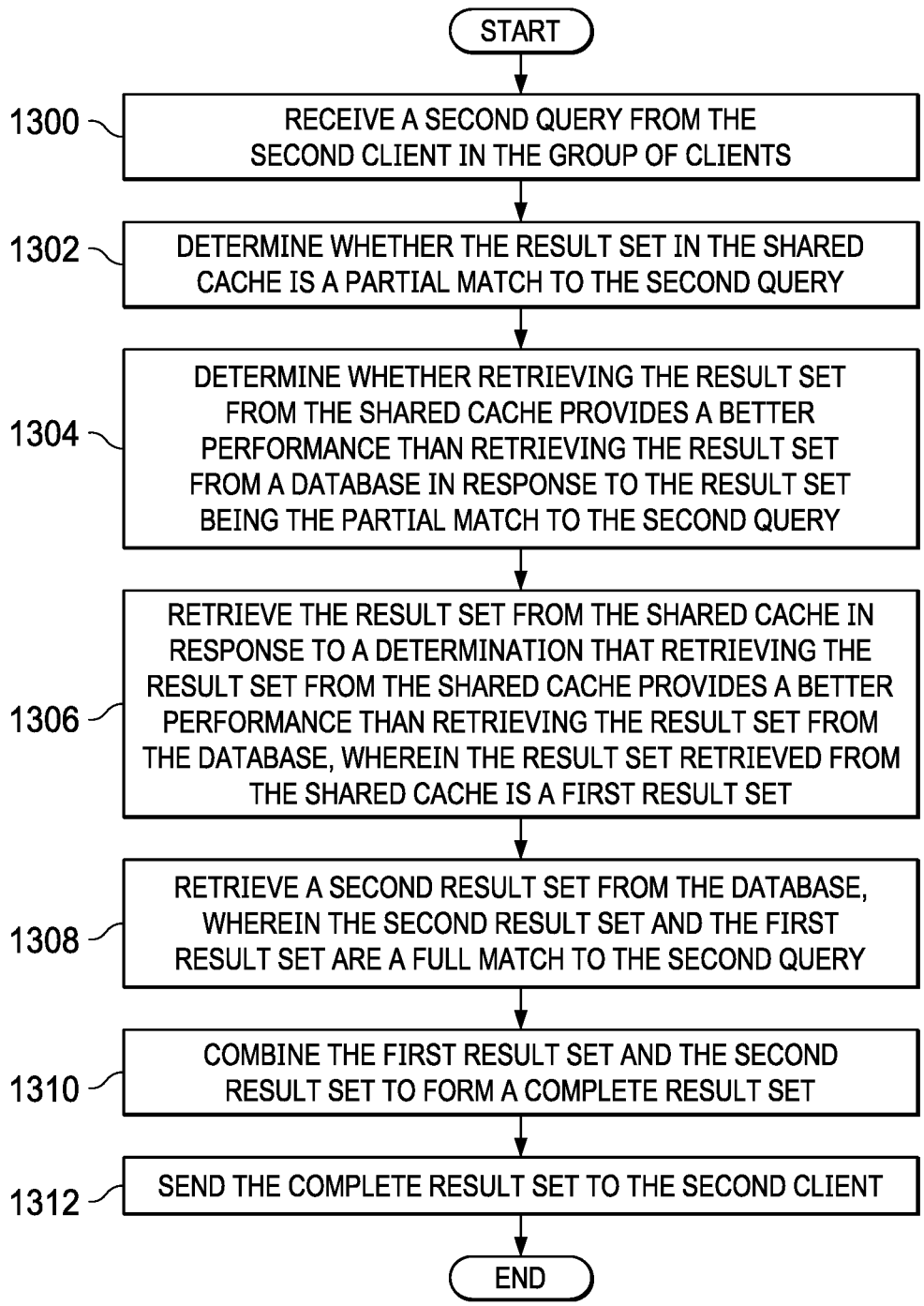
FIG. 13 is a flowchart of a process for processing a query in accordance with an illustrative embodiment.

Turning to FIG. 13, a flowchart of a process for processing a query is depicted in accordance with an illustrative embodiment. FIG. 13 is an example of additional steps that can be performed in processing query with the steps in FIG. 7.

The process begins by receiving a second query from the second client in the group of clients (step 1300). The process determines whether the result set in the shared cache is a partial match to the second query (step 1302). The process determines whether retrieving the result set from the shared cache provides better a performance than retrieving the result set from a database in response to the result set being the partial match to the second query (step 1304).

The process retrieves the result set from the shared cache in response to a determination that retrieving the result set from the shared cache provides better the performance than retrieving the result set from the database, wherein the result set retrieved from the shared cache is a first result set (step 1306). The process retrieves a second result set from the database, wherein the second result set and the first result set are a full match to the second query (step 1308).

The process combines the first result set and the second result set to form a complete result set (step 1310). The process sends the complete result set to the second client (step 1312). The process terminates thereafter.

Figure 14:
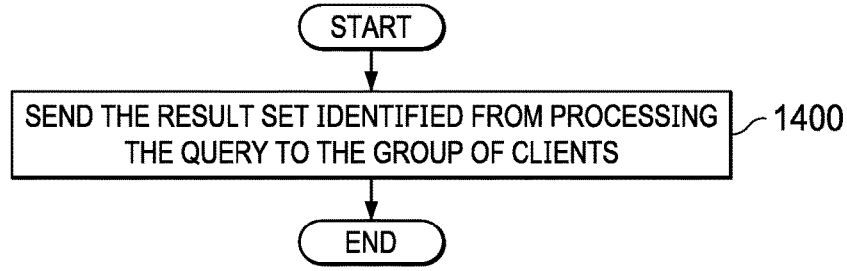
FIG. 14 is a flowchart of a process sending a result set to a group of clients in accordance with an illustrative embodiment.

Turning to FIG. 14, a flowchart of a process sending a result set to a group of clients is depicted in accordance with an illustrative embodiment. FIG. 14 is an example of additional steps that can be performed in processing query with the steps in FIG. 7.

The process sends the result set identified from processing the query to the group of clients (step 1400). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 15:
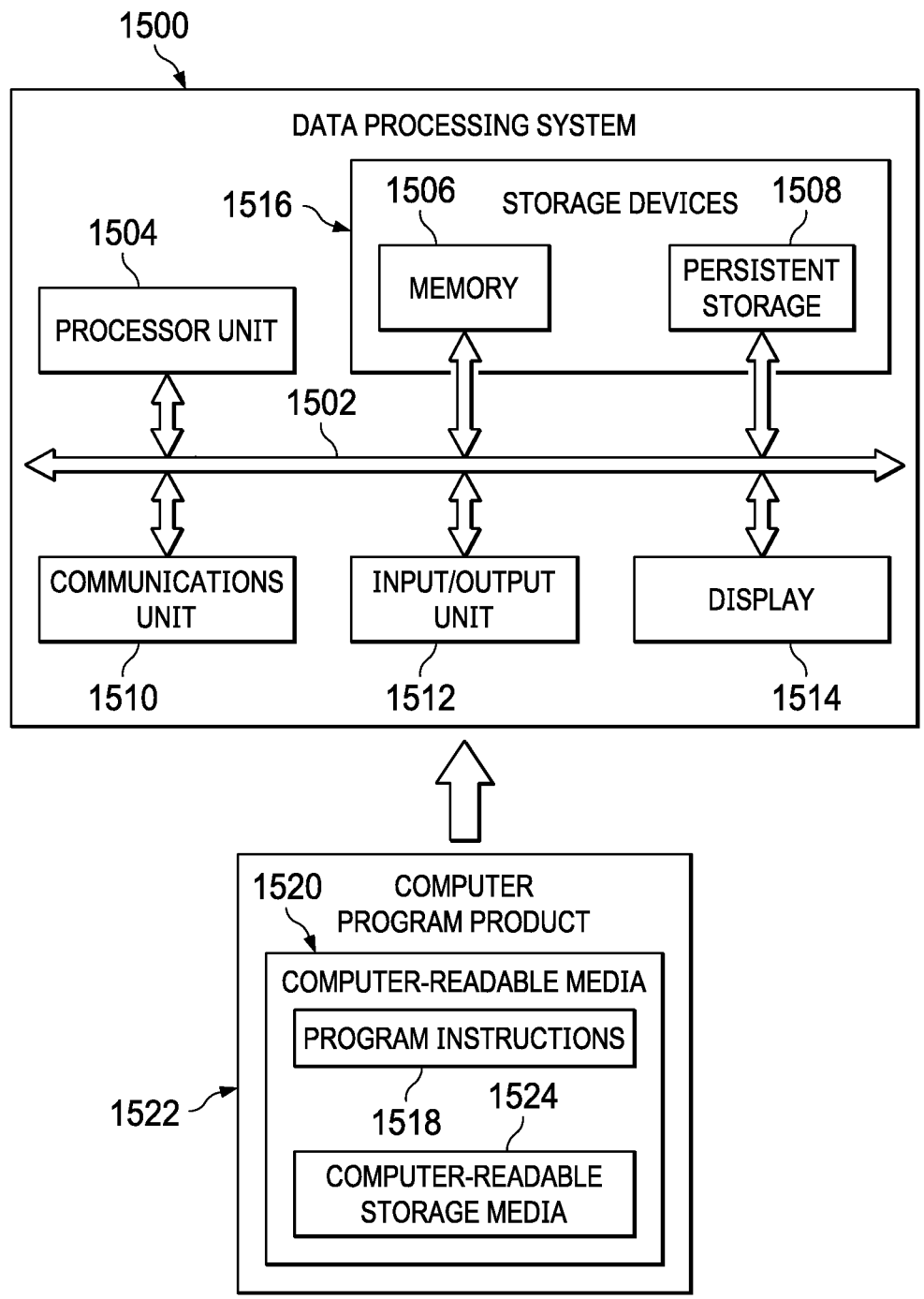
FIG. 15 is a block diagram of a data processing system in accordance with an illustrative embodiment.

Turning now to FIG. 15, a block diagram of a data processing system is depicted in accordance with an illustrative embodiment. Data processing system 1500 can be used to implement server computer 104, server computer 106, client devices 110, in FIG. 1. Data processing system 1500 can also be used to implement computer system 204. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 takes the form of a bus system.

Processor unit 1504 serves to execute instructions for software that can be loaded into memory 1506. Processor unit 1504 includes one or more processors. For example, processor unit 1504 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1504 can may be implemented using one or more heterogeneous processor systems in which a main processor is present with secondary processors on a single chip. As another illustrative example, processor unit 1504 can be a symmetric multi-processor system containing multiple processors of the same type on a single chip.

Memory 1506 and persistent storage 1508 are examples of storage devices 1516. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1516 may also be referred to as computer-readable storage devices in these illustrative examples. Memory 1506, in these examples, can be, for example, a random-access memory or any other suitable volatile or non-volatile storage device. Persistent storage 1508 may take various forms, depending on the particular implementation.

For example, persistent storage 1508 may contain one or more components or devices. For example, persistent storage 1508 can be a hard drive, a solid-state drive (SSD), a flash memory, a rewritable optical disk, a rewritable magnetic tape, or some combination of the above. The media used by persistent storage 1508 also can be removable. For example, a removable hard drive can be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that can be connected to data processing system 1500. For example, input/output unit 1512 may provide a connection for user input through at least one of a keyboard, a mouse, or some other suitable input device. Further, input/output unit 1512 may send output to a printer. Display 1514 provides a mechanism to display information to a user.

Instructions for at least one of the operating system, applications, or programs can be located in storage devices 1516, which are in communication with processor unit 1504 through communications framework 1502. The processes of the different embodiments can be performed by processor unit 1504 using computer-implemented instructions, which may be located in a memory, such as memory 1506.

These instructions are referred to as program instructions, computer usable program instructions, or computer-readable program instructions that can be read and executed by a processor in processor unit 1504. The program instructions in the different embodiments can be embodied on different physical or computer-readable storage media, such as memory 1506 or persistent storage 1508.

Program instructions 1518 is located in a functional form on computer-readable media 1520 that is selectively removable and can be loaded onto or transferred to data processing system 1500 for execution by processor unit 1504. Program instructions 1518 and computer-readable media 1520 form computer program product 1522 in these illustrative examples. In the illustrative example, computer-readable media 1520 is computer-readable storage media 1524.

Computer-readable storage media 1524 is a physical or tangible storage device used to store program instructions 1518 rather than a medium that propagates or transmits program instructions 1518. Computer readable storage media 1524, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1518 can be transferred to data processing system 1500 using a computer-readable signal media. The computer-readable signal media are signals and can be, for example, a propagated data signal containing program instructions 1518. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1520" can be singular or plural. For example, program instructions 1518 can be located in computer-readable media 1520 in the form of a single storage device or system. In another example, program instructions 1518 can be located in computer-readable media 1520 that is distributed in multiple data processing systems. In other words, some instructions in program instructions 1518 can be located in one data processing system while other instructions in program instructions 1518 can be located in one data processing system. For example, a portion of program instructions 1518 can be located in computer-readable media 1520 in a server computer while another portion of program instructions 1518 can be located in computer-readable media 1520 located in a set of client computers.

The different components illustrated for data processing system 1500 are not meant to provide architectural limitations to the manner in which different embodiments can be implemented. In some illustrative examples, one or more of the components may be incorporated in or otherwise form a portion of, another component. For example, memory 1506, or portions thereof, may be incorporated in processor unit 1504 in some illustrative examples. The different illustrative embodiments can be implemented in a data processing system including components in addition to or in place of those illustrated for data processing system 1500. Other components shown in FIG. 15 can be varied from the illustrative examples shown. The different embodiments can be implemented using any hardware device or system capable of running program instructions 1518.

Thus, illustrative embodiments of the present invention provide a computer implemented method, computer system, and computer program product for processing queries with increased performance. In one illustrative example, a computer implemented method processes a query. A number of processor units processes the query to identify a result set in response to receiving the query from a first client. The number of processor units stores the result set in a shared cache assigned to a group of clients, wherein result set stored in the shared cache is accessible by the group of clients. The number of processor units returns the result set to a second client in the group of clients from the shared cache in response to receiving the query from the second client in the group of clients.

The illustrative examples and increase performance in the processing and database queries as compared to current techniques. Further, the illustrative examples can also reduce the amount of stress or searching performed in databases. Additionally, further processing can be offloaded on client side where a client stores and returns result sets responsive to queries from clients in the same group. The illustrative examples also enable sending a result set to the entire group of clients response to a single client in the group sending a query.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment.

The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for processing a query, the computer implemented method comprising:
   processing, by a number of processor units, the query to identify a result set in response to receiving the query from a first client;
   storing, by the number of processor units, the result set in a shared cache assigned to a group of clients, wherein the result set stored in the shared cache is accessible by the group of clients; and
   returning, by the number of processor units, the result set to a second client in the group of clients from the shared cache in response to receiving the query from the second client in the group of clients.

2. The computer implemented method of claim 1, wherein the first client in a client device has the shared cache and wherein returning, by the number of processor units, the result set to the second client in the group of clients from the shared cache in response to receiving the query from the second client in the group of clients comprises:
   sending, by the number of processor units, the second client a client identifier to the first client having the shared cache, wherein the second client requests the result set from the first client.

3. The computer implemented method of claim 2, wherein a database server processing the query in a server computer has the shared cache and wherein returning, by the number of processor units, the result set to the second client in the group of clients from the shared cache in response to receiving the query from the second client in the group of clients comprises:
   sending, by the number of processor units, the result set from the shared cache in the server computer to the second client.

4. The computer implemented method of claim 1, wherein the first client in a client device has the shared cache and wherein returning, by the number of processor units, the result set to the second client in the group of clients from the shared cache in response to receiving the query from the second client in the group of clients comprises:
   creating, by the number of processor units, a hash value using the query received from the second client;
   determining, by the number of processor units, a location of the result set from a hash table of result set locations using the hash value; and
   sending a client identifier to a client having the shared cache as the location of the result set to the second client.

5. The computer implemented method of claim 1 further comprising:
   creating, by the number of processor units, a mapping of the query to a location of the result set in the shared cache.

6. The computer implemented method of claim 1 further comprising:
   receiving, by the number of processor units, a second query from the second client in the group of clients;
   determining, by the number of processor units, whether the result set in the shared cache is a partial match to the second query;
   retrieving, by the number of processor units, the result set from the shared cache in response to the result set being the partial match to the second query, wherein the result set is a first result set;
   retrieving, by the number of processor units, a second result set from a database, wherein the second result set and the first result set are a full match to the second query;
   combining, by the number of processor units, the first result set and the second result set to form a complete result set; and
   sending, by the number of processor units, the complete result set to the second client.

7. The computer implemented method of claim 1 further comprising:
   receiving, by the number of processor units, a second query from the second client in the group of clients;
   determining, by the number of processor units, whether the result set in the shared cache is a partial match to the second query;
   determining, by the number of processor units, whether retrieving the result set from the shared cache provides better a performance than retrieving the result set from a database in response to the result set being the partial match to the second query;
   retrieving, by the number of processor units, the result set from the shared cache in response to a determination that retrieving the result set from the shared cache provides better the performance than retrieving the result set from the database, wherein the result set retrieved from the shared cache is a first result set;
   retrieving, by the number of processor units, a second result set from the database, wherein the second result set and the first result set are a full match to the second query;
   combining, by the number of processor units, the first result set and the second result set to form a complete result set; and
   sending, by the number of processor units, the complete result set to the second client.

8. The computer implemented method of claim 1 further comprising:
   sending, by the number of processor units, the result set identified from processing the query to the group of clients.

9. A computer system for processing a query, the computer system comprising:
   a storage device that stores program instructions;
   a number of processor units operably connected to the storage device, wherein the number of processor units are configured to execute the program instructions to cause the computer system to:
   process a query to identify a result set in response to receiving the query from a first client;
   store the result set in a shared cache assigned to a group of clients, wherein the result set stored in the shared cache is accessible by the group of clients; and
   return the result set to a second client in the group of clients from the shared cache in response to receiving the query from the second client in the group of clients.

10. The computer system of claim 9, wherein the first client in a client device has the shared cache and wherein in returning the result set to the second client in the group of clients from the shared cache in response to receiving the query from the second client in the group of clients, the number of processor units executes program instructions to:

send the second client a client identifier to the first client having the shared cache, wherein the second client requests the result set from the first client.

11. The computer system of claim 10, wherein a database server processing the query in a server computer has the shared cache and wherein in returning the result set to the second client in the group of clients from the shared cache in response to receiving the query from the second client in the group of clients, the number of processor units executes program instructions to:
send the result set from the shared cache in the server computer to the second client.

12. The computer system of claim 9, wherein the first client in a client device has the shared cache and wherein in returning the result set to the second client in the group of clients from the shared cache in response to receiving the query from the second client in the group of clients, the number of processor units executes program instructions to:
create a hash value using the query received from the second client;
determine a location of the result set from a hash table of result set locations using the hash value; and
send a client identifier to the first client having the shared cache as the location of the result set to the second client.

13. The computer system of claim 9, wherein the number of processor units executes program instructions to:
create a mapping of the query to a location of the result set in the shared cache.

14. The computer system of claim 9, wherein the number of processor units executes program instructions to:
receive a second query from the second client in the group of clients;
determine whether the result set in the shared cache is a partial match to the second query;
retrieve the result set from the shared cache in response to the result set being the partial match to the second query, wherein the result set is a first result set;
retrieve a second result set from a database, wherein the second result set and the first result set are a full match to the second query;
combine the first result set and the second result set to form a complete result set; and
send the complete result set to the second client.

15. The computer system of claim 9, wherein the number of processor units executes program instructions to:
receive a second query from the second client in the group of clients;
determine whether the result set in the shared cache is a partial match to the second query;
determine whether retrieving the result set from the shared cache provides better a performance than retrieving the result set from a database in response to the result set being the partial match to the second query;
retrieve the result set from the shared cache in response to a determination that retrieving the result set from the shared cache provides better the performance than retrieving the result set from the database, wherein the result set retrieved from the shared cache is a first result set;
retrieve a second result set from the database, wherein the second result set and the first result set are a full match to the second query;
combine the first result set and the second result set to form a complete result set; and
sending the complete result set to the second client.

16. The computer system of claim 9, wherein the number of processor units executes program instructions to:
send the result set identified from processing the query to the group of clients.

17. A computer program product for processing a query, the computer program product comprising a computer readable storage medium having program instructions embodied therewith, the program instructions executable by a computer system to cause the computer system to perform a method of:
processing, by a number of processor units, the query to identify a result set in response to receiving the query from a first client;
storing, by the number of processor units, the result set in a shared cache assigned to a group of clients, wherein the result set stored in the shared cache is accessible by the group of clients; and
returning, by the number of processor units, the result set to a second client in the group of clients from the shared cache in response to receiving the query from the second client in the group of clients.

18. The computer program product of claim 17, wherein the first client in a client device has the shared cache and wherein returning, by the number of processor units, the result set to the second client in the group of clients from the shared cache in response to receiving the query from the second client in the group of clients comprises:
sending, by the number of processor units, the second client a client identifier to the first client having the shared cache, wherein the second client requests the result set from the first client.

19. The computer program product of claim 18, wherein a database server processing the query in a server computer has the shared cache and wherein returning, by the number of processor units, the result set to the second client in the group of clients from the shared cache in response to receiving the query from the second client in the group of clients comprises:
sending, by the number of processor units, the second client the result set from the shared cache in the server computer.

20. The computer program product of claim 17, wherein the first client in a client device has the shared cache and wherein returning, by the number of processor units, the result set to the second client in the group of clients from the shared cache in response to receiving the query from the second client in the group of clients comprises:
creating, by the number of processor units, a hash value using the query received from the second client;
determining, by the number of processor units, a location of the result set from a hash table of result set locations using the hash value; and
sending a client identifier to the first client having the shared cache as the location of the result set to the second client.

* * * * *